United States Patent
Tanji et al.

[11] Patent Number: 6,100,821
[45] Date of Patent: Aug. 8, 2000

[54] APPARATUS FOR DETECTING MAGNETOSTRICTIVE RESONATOR AND TRAFFIC SYSTEM

[75] Inventors: Yoshihiko Tanji, Osaka; Toshihiro Yoshioka, Katano, both of Japan

[73] Assignee: Matsushita Electric Industrial Co., Ltd., Osaka, Japan

[21] Appl. No.: 09/096,983

[22] Filed: Jun. 12, 1998

[30] Foreign Application Priority Data

Jun. 13, 1997 [JP] Japan ................... 9-156332

[51] Int. Cl.[7] ................... G08G 1/123
[52] U.S. Cl. ................... 340/988; 340/933; 340/941; 340/825.34; 340/461; 180/168
[58] Field of Search ................... 340/988, 933, 340/941, 825.34, 461; 180/168

[56] References Cited

U.S. PATENT DOCUMENTS

| | | | |
|---|---|---|---|
| 3,576,525 | 4/1971 | Prucha | 340/941 |
| 3,870,990 | 3/1975 | Fathauer | 340/941 |
| 4,361,202 | 11/1982 | Minovitch | 180/168 |
| 4,401,181 | 8/1983 | Schwarz | 180/168 |
| 4,636,782 | 1/1987 | Nakamura et al. | 340/461 |
| 4,800,978 | 1/1989 | Wasa et al. | 180/168 |
| 5,150,617 | 9/1992 | Schwarz et al. | 73/579 |
| 5,153,525 | 10/1992 | Hoekman et al. | 340/941 |
| 5,245,335 | 9/1993 | Hill et al. | 340/941 |
| 5,347,456 | 9/1994 | Zhang et al. | 180/168 |
| 5,506,584 | 4/1996 | Boles | 340/825.34 |
| 5,708,427 | 1/1998 | Bush | 340/933 |

FOREIGN PATENT DOCUMENTS

| | | |
|---|---|---|
| 338696 | of 0000 | European Pat. Off. . |
| 2069209 | of 0000 | United Kingdom . |

OTHER PUBLICATIONS

Patent Abstracts of Japan, Publication Number 07244788, Mar. 03, 1994.
Patent Abstracts of Japan, Publication Number 58070616, Apr. 27, 1983.

*Primary Examiner*—Brent A. Swarthout
*Assistant Examiner*—John Tweel, Jr.
*Attorney, Agent, or Firm*—Pearne & Gordon LLP

[57] ABSTRACT

A magnetostrictive resonator detection apparatus includes a transmission section for transmitting a resonance frequency of a magnetostrictive resonator, and a reception section for detecting a resonance frequency oscillated by the magnetostrictive resonator.

18 Claims, 2 Drawing Sheets

(1) TRANSMISSION  (2) RESONATION  (3) READ

APPARATUS FOR DETECTING MAGNETOSTRICTIVE RESONATOR AND TRAFFIC SYSTEM

BACKGROUND OF THE INVENTION

1. Field of the Invention

This invention relates to a magnetostrictive resonator detection apparatus for detecting the presence of a magnetostrictive resonator and a traffic system for detecting the position and orientation of a magnetostrictive resonator buried in a road, thereby checking the vehicle position on the road and providing safety information for vehicle driving and road maintenance management.

2. Description of the Related Art

Hitherto, a median strip and a roadside on a road have been displayed by white lines, etc., and visually checked by vehicle drivers.

However, a snowplow at the snowfall time loses sight of the roadside or to again draw white lines, the road is closed to traffic and the white lines must be drawn by human power, interfering with labor saving and automatization.

In road facilities, it is difficult to provide a safe marker and a safe on-vehicle detection apparatus capable of identifying a median strip and a roadside in a non-contact manner and at low costs because of economics restrictions.

SUMMARY OF THE INVENTION

The invention has been made to eliminate the above problems with the prior art, and therefore an object of the invention is to provide a magnetostrictive resonator detection apparatus that can be installed on a vehicle for detecting markers made of magnetostrictive resonators that can be installed in conventional roads and reinforced concrete roads and a traffic system intended for safety of road maintenance management and labor saving.

To achieve the above object, a first magnetostrictive resonator detection apparatus of the invention comprises a transmission section for transmitting a resonance frequency of a magnetostrictive resonator and a reception section for detecting a resonance frequency oscillated by the magnetostrictive resonator.

In a second magnetostrictive resonator detection apparatus of the invention, the reception section detects the resonance frequency oscillated by the magnetostrictive resonator after the transmission section terminates transmission.

In a third magnetostrictive resonator detection apparatus of the invention, the transmission section and the reception section share a single antenna, the magnetostrictive resonator detection apparatus further including a switch section for switching transmission and reception of the antenna.

A fourth magnetostrictive resonator detection apparatus of the invention further includes a discharge resistor, the discharge resistor being activated at the switching time from transmission to reception.

A fifth magnetostrictive resonator detection apparatus of the invention further includes an intermediate frequency conversion section for converting the resonance frequency of the magnetostrictive resonator received by the reception section into an intermediate frequency and a detection section for detecting output from the intermediate frequency conversion section, wherein the transmission section transmits a plurality of different resonance frequencies.

A sixth magnetostrictive resonator detection apparatus of the invention further includes a local oscillation section for oscillating the difference frequency between a transmitted frequency and intermediate frequency, wherein the intermediate frequency conversion section adds output of the local oscillation section to the received frequency to produce the intermediate frequency.

In a seventh magnetostrictive resonator detection apparatus of the invention, the local oscillation section is one direct digital synthesizer for oscillating the difference frequency between a transmitted frequency and intermediate frequency and oscillating the transmitted frequency.

An eighth magnetostrictive resonator detection apparatus of the invention further includes tuning capacitors in a one-to-one correspondence with a plurality of different resonance frequencies, one of the tuning capacitors being selected in conformance with the oscillated resonance frequency.

In a ninth magnetostrictive resonator detection apparatus of the invention, one of a plurality of different resonance frequencies is transmitted and received and then a resonance frequency different from that resonance frequency is transmitted and received.

A tenth magnetostrictive resonator detection apparatus of the invention further includes a display section for specifying a magnetostrictive resonator and displaying the detection level thereof on a bar graph.

A first traffic system of the invention comprises a road having magnetostrictive resonators and a vehicle having a magnetostrictive resonator detection apparatus.

In a second traffic system of the invention, the magnetostrictive resonators consist of a first magnetostrictive resonator installed between up and down lanes on the road, a second magnetostrictive resonator installed in the proximity of a road shoulder of the up lane, and a third magnetostrictive resonator installed in the proximity of a road shoulder of the down lane, and the first, second, and third magnetostrictive resonators oscillate different resonance frequencies.

In a third traffic system of the invention, the vehicle detects the magnetostrictive resonators and is driven automatically.

In a fourth traffic system of the invention, the magnetostrictive resonators are buried in the road.

A fifth traffic system of the invention further includes a display section for displaying the road, the vehicle, and the vehicle position on the road.

DETAILED DESCRIPTION OF THE PREFERRED EMBODIMENTS

Figure 1A:
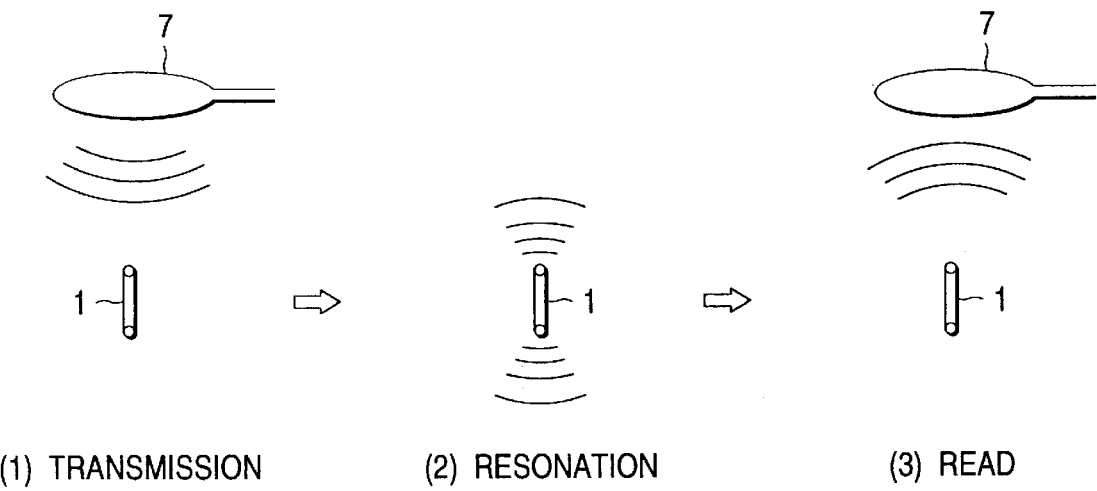
FIG. 1A is an illustration to show the detection principle of a magnetostrictive resonator detection apparatus in one embodiment of the invention.

The first magnetostrictive resonator detection apparatus of the invention oscillates a magnetostrictive resonator and can detect the resonance frequency of the magnetostrictive resonator, thereby detecting the presence of the magnetostrictive resonator.

In the second magnetostrictive resonator detection apparatus of the invention, the reception section detects the resonance frequency oscillated by the magnetostrictive resonator after the transmission section terminates transmission, so that the magnetostrictive resonator detection apparatus can detect the presence of the magnetostrictive resonator reliably.

The third magnetostrictive resonator detection apparatus, which further includes the switch section, can transmit and receive a signal through one antenna.

The fourth magnetostrictive resonator detection apparatus activates the discharge resistor at the switching time from transmission to reception, thus can prevent reception interference caused by reverberation of transmission output.

The fifth magnetostrictive resonator detection apparatus of the invention further includes the intermediate frequency conversion section. Thus, if a plurality of different resonance frequencies are received, they can be detected by one detection section.

In the sixth magnetostrictive resonator detection apparatus of the invention, the intermediate frequency conversion section adds output of the local oscillation section to the received frequency to produce the intermediate frequency. Thus, an advantage similar to that of the fifth magnetostrictive resonator detection apparatus can be provided by the simple configuration.

The seventh magnetostrictive resonator detection apparatus of the invention, which simply comprises one direct digital synthesizer, can provide an advantage similar to that of the fifth magnetostrictive resonator detection apparatus.

The eighth magnetostrictive resonator detection apparatus of the invention can reliably transmit and receive a plurality of different resonance frequencies by selecting one of the tuning capacitors in conformance with the oscillated resonance frequency.

The ninth magnetostrictive resonator detection apparatus of the invention transmits and receives one of a plurality of different resonance frequencies and then transmits and receives a resonance frequency different from that resonance frequency, whereby the apparatus can reliably detect a plurality of magnetostrictive resonators.

The tenth magnetostrictive resonator detection apparatus of the invention enables the user to easily see the detection levels of magnetostrictive resonators.

The first traffic system of the invention comprises a road having magnetostrictive resonators and a vehicle having a magnetostrictive resonator detection apparatus and thus can provide a system wherein the vehicle is driven safely.

In the second traffic system of the invention, the magnetostrictive resonators oscillate different resonance frequencies, so that a safe and reliable driving system can be provided.

In the third traffic system of the invention, the vehicle detects the magnetostrictive resonators and is driven automatically. Thus, a safe and reliable traffic system fitted to an aging population can be provided.

In the fourth traffic system of the invention, the magnetostrictive resonators are buried in the road, so that durability of the magnetostrictive resonators is improved.

The fifth traffic system of the invention can easily and reliably keep track of the vehicle position on the road.

Now, a description will be given in more detail of preferred embodiments of the invention with reference to the accompanying drawings.

Generally, when an AC electric field or an AC magnetic field at a specific frequency is given to a magnetostrictive resonator like a thin plate or a rod given a magnetic bias, vibration is produced longitudinally and amplitude reaches the maximum at a resonance frequency. At the same time, the amplitude is in a mechanical resonance state for a short time if electromagnetic field is removed, whereby AC magnetization is generated and an electromagnetic wave is emitted. (Refer to (4) Jiwaisouhakinogenri on pages 34–36 of kaiteizouho "jiwaishindoutochouonpa" by YOSHIMITSU KIKUCHI, published by Coronasha.)

Figure 1B:
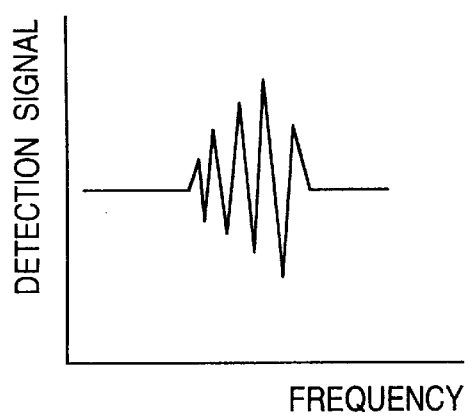
FIG. 1B is an illustration to show a detection signal detected by the apparatus.

FIG. 1A is an illustration to show the detection principle of the magnetostrictive resonator detection apparatus in the embodiment of the invention and FIG. 1B is an illustration to show a detection signal detected by the apparatus. In FIGS. 1A and 1B, an electromagnetic wave at a resonance frequency is transmitted for a short time from an antenna 7 (1) and a magnetostrictive resonator 1 is made to resonate (2). Then, the resonance echo is detected through the antenna 7 (3). In the embodiment, one antenna 7 is used for both transmission and reception.

Figure 2:
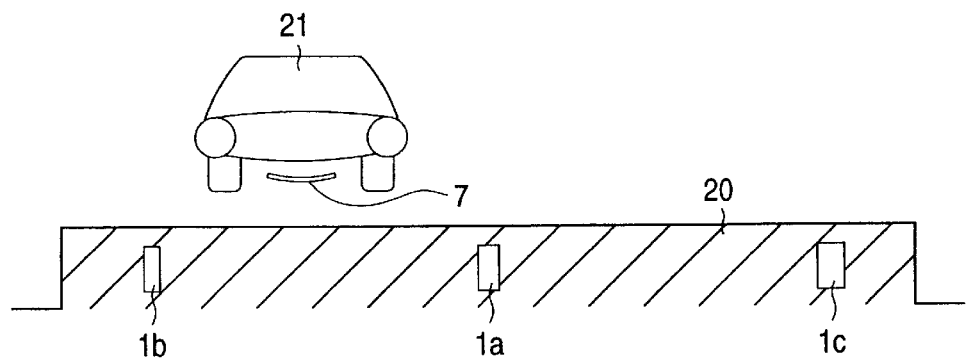
FIG. 2 is an illustration to show an example of applying the magnetostrictive resonator detection apparatus to a traffic system.

FIG. 2 is an illustration to show an example of applying the magnetostrictive resonator detection apparatus in the embodiment of the invention to a traffic system; it shows the positional relationship between the antenna 7 attached to a vehicle 21 and magnetostrictive resonators 1a, 1b, and 1c buried in a road 20.

Referring now to the accompanying drawings, the magnetostrictive resonator detection apparatus in the embodiment of the invention will be discussed.

Figure 3:
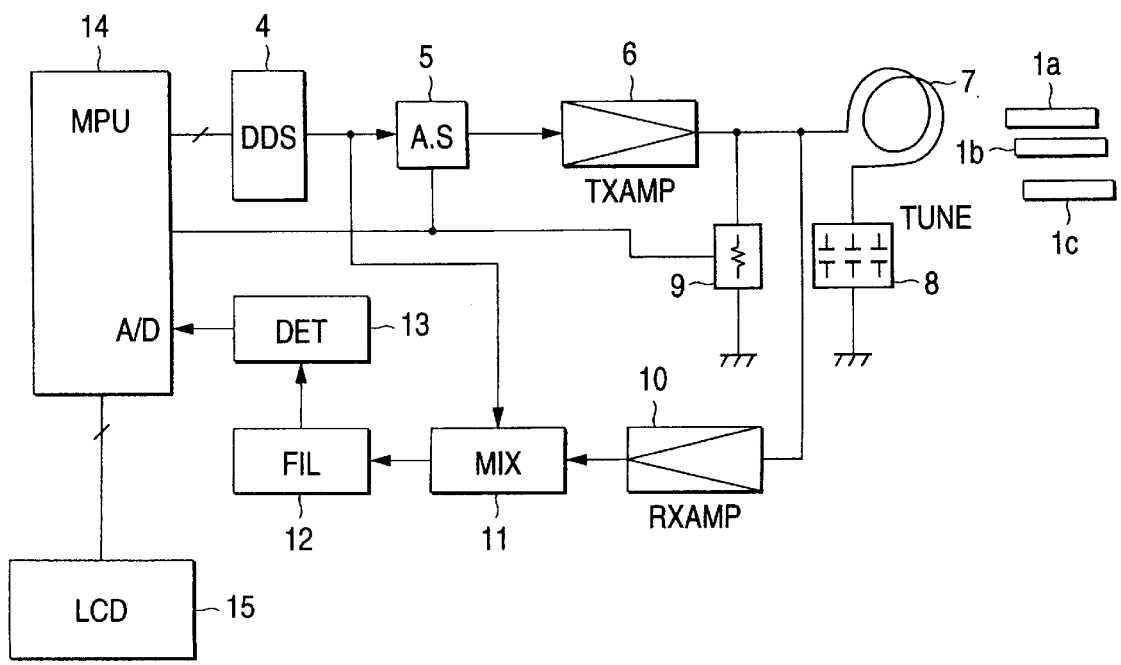
FIG. 3 is a block diagram of the magnetostrictive resonator detection apparatus.

FIG. 3 is a block diagram of the magnetostrictive resonator detection apparatus in the embodiment of the invention. In the figure, numeral 14 is a microprocessing unit (MPU) for controlling the magnetostrictive resonator detection apparatus, numeral 4 is a direct digital synthesizer (DDS) for oscillating the resonance frequency of each magnetostrictive resonator and the difference frequency between the resonance frequency and intermediate frequency, numeral 5 is a transmission and reception switch section for switching transmission and reception, numeral 6 is a transmission amplifier, numeral 7 is an antenna used for both transmission and reception, numeral 8 is a tuning capacitor section wherein an optimum capacitor is selected in response to transmitted or received resonance frequency, numeral 9 is a discharge resistor activated for a short time at the transmission termination time (at the switching time from transmission to reception), numeral 10 is a reception amplification section for amplifying a received signal, numeral 11 is an intermediate frequency conversion section for converting a received frequency into an intermediate frequency, numeral 12 is a filter section for attenuating noise other than the intermediate frequency, numeral 13 is an amplification detector section, and numeral 15 is a display section.

The resonance frequencies of the magnetostrictive resonators 1a, 1b, and 1c can be set roughly at 30-kHz steps from 90 kHz and can be selected up to 445 kHz preceding commercial medium wave broadcasting frequencies. The embodiment assumes that the buried median strip magnetostrictive resonator 1a is set to resonance frequency f1=210 kHz, that the buried up road shoulder magnetostrictive resonator 1b is set to resonance frequency f2=240 kHz, and that the buried down road shoulder magnetostrictive resonator 1c is set to resonance frequency f3=270 kHz.

The operation of the magnetostrictive resonator detection apparatus installed on the vehicle 21 in the embodiment is performed as follows:

The MPU 14 causes the DDS 4 to oscillate the resonance frequency of the median strip magnetostrictive resonator 1a, f1, sets the transmission and reception switch section 5 to transmission, amplifies power by the transmission amplifier 6, and outputs an electromagnetic wave from the antenna 7. At this time, an optimum capacitor for the frequency to be transmitted (in this case, f1) is selected in the tuning capacitor section 8 and is connected to a return terminal of the antenna 7 in series.

The electromagnetic wave is thus emitted to the median strip magnetostrictive resonator 1a. If the median strip magnetostrictive resonator 1a is in the resonance range, a resonance state is entered. Next, reception mode is entered. At this time, the discharge resistor 9 is activated for a short time.

Next, the difference frequency between intermediate frequency fc (for example, 3.58 MHz) and the resonance frequency f1 of the median strip magnetostrictive resonator 1a is oscillated from the DDS 4 as local oscillation of the intermediate frequency conversion section 11. At the same time, the transmission and reception switch section 5 is set to reception.

An electromagnetic wave echo signal generated due to resonance of the median strip magnetostrictive resonator 1a is input through the antenna 7 to the reception amplification section 10, which then amplifies the signal. At this time, the same value remains selected in the tuning capacitor section 8. The echo signal is converted into an intermediate frequency by the intermediate frequency conversion section 11.

Next, noise other than the intermediate frequency fc is attenuated through the filter section 12. Further, the signal is set as reception level by the amplification detector section 13 and is input to the MPU 14 through A/D converter input thereof and operation processing is performed on the signal. The result is displayed on the display section 15.

Subsequently, the up road shoulder magnetostrictive resonator 1b and the down road shoulder magnetostrictive resonator 1c are detected cyclically in sequence for determining the position on the road. At this time, selection is executed in the DDS 4 and the tuning capacitor section 8 in a similar manner to that described above.

In the magnetostrictive resonator detection apparatus of the embodiment, the display section 15 specifies the magnetostrictive resonators and displays the detection levels thereof on a bar graph.

The display section 15 may also display the road, the vehicle, and the vehicle position on the road.

Thus, in the embodiment, electromagnetic waves at specific resonance frequencies are emitted through the antenna 7 attached to the vehicle 21 in sequence to the median strip magnetostrictive resonator 1a, the up road shoulder magnetostrictive resonator 1b, and the down road shoulder magnetostrictive resonator 1c buried in the road 20. When the magnetostrictive resonator 1a, 1b, 1c is in the electromagnetic wave reception range in which it can enter a resonance state, a vibration echo of the magnetostrictive resonators 1a, 1b, 1c is input through the antenna 7, amplified, and detected for determining the positional relationship between the vehicle 21 and the road 20.

An electromagnetic wave is selectively emitted to the magnetostrictive resonators 1a, 1b, 1c for a short time and a bleeder current is made to flow, thereby terminating the electromagnetic wave emission. The antenna 7 is provided with tuning circuits in a one-to-one correspondence with resonance frequencies (tuning capacitor section 8). At the reception time, to efficiently distinguish the vibration echo of the magnetostrictive resonator in the resonance range, a signal received by a heterodyne system is converted into an intermediate frequency signal, which is then amplified and detected as reception level. The result is input to the A/D converter section of the MPU 14, determination processing is performed, and display output and control output are performed.

Therefore, by installing the magnetostrictive resonator detection apparatus of the embodiment on the vehicle 21, the magnetostrictive resonators 1a, 1b, and 1c buried in the road 20 can be detected in real time in a non-contact manner and by detecting a road shoulder and a median strip, automatization and labor saving of clearing snow and drawing white lines safely; the role of the magnetostrictive resonator detection apparatus of the embodiment for road maintenance is great.

If the infrastructure is furthermore constructed, the magnetostrictive resonator detection apparatus is useful for automatic driving support of vehicles.

Thus, the road facilities manager can efficiently carry out road maintenance while providing safety.

The magnetostrictive resonators 1a, 1b, and 1c buried in the road 20 may be placed only in the proximity of the shoulder of a narrow road or may be added between lanes on a wide road having more than one lane on one side.

The detection order of the magnetostrictive resonators (resonance frequency oscillating order) is not limited to that in the embodiment; the magnetostrictive resonators can be detected in various orders, for example, in the order of the median strip magnetostrictive resonator 1a, the up road shoulder magnetostrictive resonator 1b, the median strip magnetostrictive resonator 1a, and the down road shoulder magnetostrictive resonator 1c.

Further, the magnetostrictive resonators may be installed at the center of a lane for automatically driving the vehicle 21 and more than one piece of information may be contained in one magnetostrictive resonator.

In the embodiment, one antenna is used for both transmission and reception, but a transmission antenna and a reception antenna may be provided separately or more than one transmission antenna and more than one reception antenna may be installed.

As seen from the description made so far, the first magnetostrictive resonator detection apparatus of the invention oscillates a magnetostrictive resonator and can detect the resonance frequency of the magnetostrictive resonator, thereby detecting the presence of the magnetostrictive resonator.

In the second magnetostrictive resonator detection apparatus of the invention, the reception section detects the resonance frequency oscillated by the magnetostrictive resonator after the transmission section terminates transmission, so that the magnetostrictive resonator detection apparatus can detect the presence of the magnetostrictive resonator reliably.

The third magnetostrictive resonator detection apparatus, which further includes the switch section, can transmit and receive a signal through one antenna.

The fourth magnetostrictive resonator detection apparatus activates the discharge resistor at the switching time from transmission to reception, thus can prevent reception interference caused by reverberation of transmission output.

The fifth magnetostrictive resonator detection apparatus of the invention further includes the intermediate frequency conversion section. Thus, if a plurality of different resonance frequencies are received, they can be detected by one detection section.

In the sixth magnetostrictive resonator detection apparatus of the invention, the intermediate frequency conversion section adds output of the local oscillation section to the received frequency to produce the intermediate frequency. Thus, an advantage similar to that of the fifth magnetostrictive resonator detection apparatus can be provided by the simple configuration.

The seventh magnetostrictive resonator detection apparatus of the invention, which simply comprises one direct digital synthesizer, can provide an advantage similar to that of the fifth magnetostrictive resonator detection apparatus.

The eighth magnetostrictive resonator detection apparatus of the invention can reliably transmit and receive a plurality of different resonance frequencies by selecting one of the tuning capacitors in conformance with the oscillated resonance frequency.

The ninth magnetostrictive resonator detection apparatus of the invention transmits and receives one of a plurality of different resonance frequencies and then transmits and receives a resonance frequency different from that resonance frequency, whereby the apparatus can reliably detect a plurality of magnetostrictive resonators.

The tenth magnetostrictive resonator detection apparatus of the invention enables the user to easily see the detection levels of magnetostrictive resonators.

The first traffic system of the invention comprises a road having magnetostrictive resonators and a vehicle having a magnetostrictive resonator detection apparatus and thus can provide a system wherein the vehicle is driven safely.

In the second traffic system of the invention, the magnetostrictive resonators oscillate different resonance frequencies, so that a safe and reliable driving system can be provided.

In the third traffic system of the invention, the vehicle detects the magnetostrictive resonators and is driven automatically. Thus, a safe and reliable traffic system fitted to an aging population can be provided.

In the fourth traffic system of the invention, the magnetostrictive resonators are buried in the road, so that durability of the magnetostrictive resonators is improved.

The fifth traffic system of the invention can easily and reliably keep track of the vehicle position on the road.

What is claimed is:

1. A magnetostrictive resonator detection apparatus, comprising:
   a transmission section for transmitting a resonance frequency of a magnetostrictive resonator; and
   a reception section for detecting a resonance frequency oscillated by the magnetostrictive resonator, wherein one of a plurality of different resonance frequencies is transmitted and received and then another resonance frequency, different from said one resonance frequency, is transmitted and received, and wherein said reception section detects the resonance frequency oscillated by the magnetostrictive resonator after said transmission section terminates transmission, said transmission section and said reception section sharing a single antenna, and a switch section being provided to switch said antenna between reception and transmission.

2. The magnetostrictive resonator detection apparatus as claimed in claim 1, further comprising a discharge resistor, said discharge resistor being activated at the switching time from transmission to reception.

3. A magnetostrictive resonator detection apparatus, comprising:
   a transmission section for transmitting a plurality of different resonance frequencies including a resonance frequency of a magnetostrictive resonator;
   a reception section for detecting a resonance frequency oscillated by the magnetostrictive resonator; and,
   an intermediate frequency conversion section for converting the resonance frequency of the magnetostrictive resonator received by said reception section into an intermediate frequency; and,
   a detection section for detecting output from said intermediate frequency conversion section.

4. The magnetostrictive resonator detection apparatus as claimed in claim 3, further comprising a local oscillation section for oscillating a difference frequency between a transmitted frequency and intermediate frequency, wherein said intermediate frequency conversion section adds output of said local oscillation section to the received frequency to produce the intermediate frequency.

5. The magnetostrictive resonator detection apparatus as claimed in claim 4, wherein said local oscillation section is one direct digital synthesizer for oscillating a difference frequency between a transmitted frequency and intermediate frequency and oscillating the transmitted frequency.

6. The magnetostrictive resonator detection apparatus as claimed in claim 1, further comprising tuning capacitors in a one-to-one correspondence with said plurality of different resonant frequencies, one of said tuning capacitors being selected in conformance with the oscillated resonance frequency.

7. The magnetostrictive resonator detection apparatus as claimed in claim 1, further comprising a display section for specifying a magnetostrictive resonator and displaying a detection level thereof on a bar graph.

8. A traffic system, comprising:
   a road having a plurality of magnetostrictive resonators, each of said magnetostrictive resonators having a resonant frequency;
   a vehicle having a magnetostrictive resonator detection apparatus, said resonator detection apparatus comprising:
      a transmission section for transmitting a plurality of different resonance frequencies in correspondence with the resonant frequencies of said plurality of magnetostrictive resonators; and
      a reception section for detecting a resonance frequency oscillated by each of said plurality of magnetostrictive resonators, wherein said reception section detects the resonance frequency oscillated by said magnetostrictive resonators after said transmission section terminates transmission.

9. The traffic system as claimed in claim 8 wherein the plurality of magnetostrictive resonators consist of a first magnetostrictive resonator installed between up and down lanes on said road, a second magnetostrictive resonator installed in the proximity of a road shoulder of the up lane, and a third magnetostrictive resonator installed in the proximity of a road shoulder of the down lane, and the first, second, and third magnetostrictive resonators oscillate different resonance frequencies.

10. The traffic system as claimed in claim 8, wherein said vehicle detects the magnetostrictive resonators and is driven automatically.

11. The traffic system as claimed in claim 8, wherein the magnetostrictive resonators are buried in said road.

12. The traffic system as claimed in claim 8, further comprising a display section for displaying said road, said vehicle, and a vehicle position on said road. frequencies.

13. The magnetostrictive resonator detection apparatus as claimed in claim 3, further comprising tuning capacitors in a one-to-one correspondence with said plurality of different resonance frequencies, one of said tuning capacitors being selected in conformance with the oscillated resonance frequency.

14. The magnetostrictive resonator detection apparatus as claimed in claim 3, wherein one of said plurality of resonance frequencies is transmitted and received and then another of said plurality of resonance frequencies, different from said one resonance frequency, is transmitted and received.

15. The traffic system as claimed in claim 9, further comprising:

- an intermediate frequency conversion section for converting the resonance frequency of the magnetostrictive resonator received by said reception section into an intermediate frequency and a detection section for detecting output from said intermediate frequency conversion section.

16. The traffic system as claimed in claim 8, further comprising tuning capacitors in a one-to-one correspondence with said plurality of resonance frequencies, one of said tuning capacitors being selected in conformance with the oscillated resonance frequency.

17. The traffic system as claimed in claim 16, wherein one of said plurality of resonance frequencies is transmitted and received and then another of said plurality of resonance frequencies, different from said one resonance frequency, is transmitted and received.

18. The traffic system as claimed in claim 17, wherein said transmission section and said reception section share a common antenna.

* * * * *